March 8, 1927. 1,620,085

B. L. DRISCOLL

PLOW

Filed April 17, 1923

WITNESS:
H. Sherburne

INVENTOR
Bartholomew L. Driscoll.
BY White Prost & Evans
his ATTORNEYS

Patented Mar. 8, 1927.

1,620,085

UNITED STATES PATENT OFFICE.

BARTHOLOMEW L. DRISCOLL, OF WATSONVILLE, CALIFORNIA.

PLOW.

Application filed April 17, 1923. Serial No. 632,645.

My invention relates to plows, and particularly to orchard plows. One of the objects of the invention is the provision of a plow of special value in cultivation of the soil around orchard trees, and one which will work the soil between and close around the trunks of the trees without cross plowing or manual labor, that is to say, a plow which will not leave islands of uncultivated soil around each tree.

Another object of the invention is the provision of a plow of the character described in which one of the cultivating implements is moved about the tree on engagement of the mounting of said implement with the tree and in which means are provided for eliminating any possibility of injury to the tree.

My invention possesses other objects and features of advantage, some of which, with the foregoing, will be set forth in the following description of my invention. It is to be understood that I do not limit myself to the showing made by the said description, as I may adopt variant forms of the invention within the scope of the claims.

Figure 1:
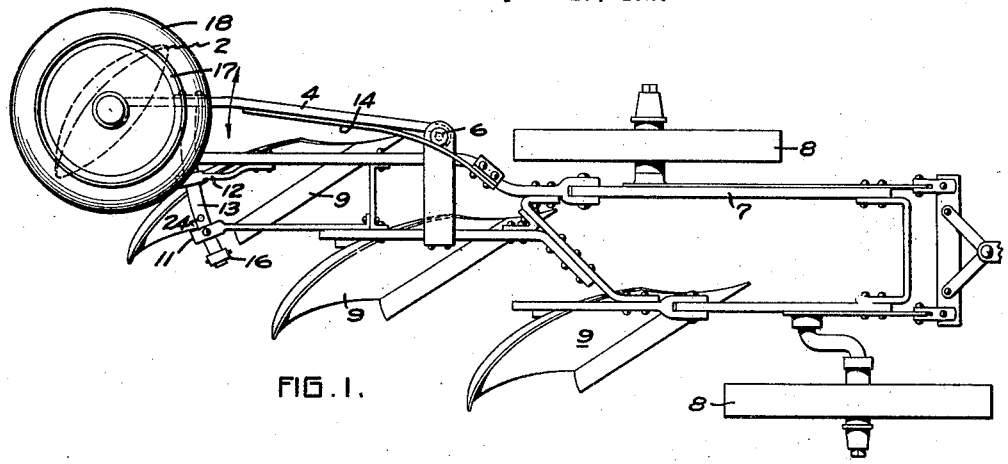
Figure 2:
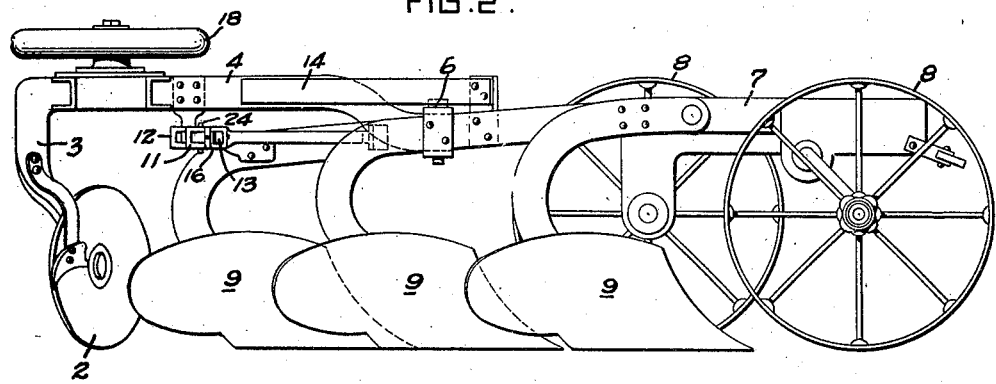
Figure 3:
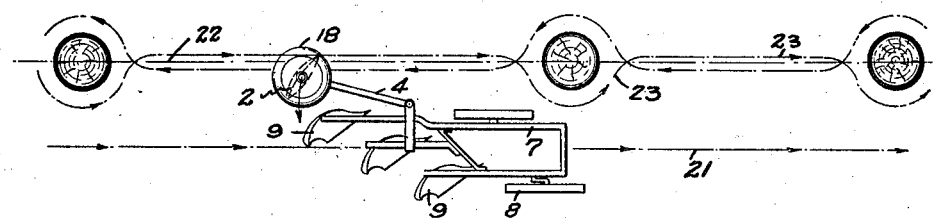

Referring to the drawings: Fig. 1 is a plan view of the orchard plow of my invention, and Fig. 2 is a side elevation of the plow. Fig. 3 is a plan view in diagram, particularly indicating the path of travel of the plow.

In terms of broad inclusion, my invention comprises a cultivating implement such as a disk mounted upon a frame, which is journaled for pivotal movement about a vertical axis on a wheeled main frame which also carries a number of fixed cultivating implements or shares in the usual manner. The pivoted frame extends to one side of the wheeled frame so that the disk thereon works the soil at least as far in between the successive trees in a row as the center line connecting the centers of the trees. The main or wheeled frame is propelled in a substantially straight line between the rows and sufficiently far therefrom to prevent contact with the trees, the fixed shares working the ground in the clear between the rows. Means are provided for moving the pivotally mounted cultivating implement or disk, which extends between the trees, around each tree as the tree is reached so that bumping into the tree is avoided and the soil is worked close to the tree. When the plow travels on the opposite side of the same row on the return trip, the pivotally mounted cultivating implement reaches the remainder of the soil between the trees and on the completion of a round trip up one side of the row and down the opposite side, all of the soil adjacent the trees has been turned over so that there are no islands of uncultivated ground requiring to be separately worked by cross plowing or otherwise.

In greater detail, my invention comprises a cultivating disk 2 mounted upon an arm 3 forming part of a frame 4 which is mounted for pivotal motion about a vertical axis 6, on the main frame of the gang plow generally designated by the character 7. The gang plow may be of any desired type, that shown being provided with the supporting wheels 8 and the fixed shares 9 which operate in the usual way. The main frame of the plow is provided with spaced bracket arms 11 and 12, which provide a mounting in which the arm 13, fixed on the pivotal frame 4, may slide. The arm 13 is curved in an arc concentric with the vertical axis 6, and provides additional support for the pivoted frame and means for carrying the torsional and lifting stresses imparted to the frame by the action of the disk 2. A spring 14 interposed between the pivoted and main frames resiliently presses the pivoted frame outwardly, and this outward movement is limited by a collar 16 adjustable upon the arcuate arm 13.

Journaled on a vertical axis adjacent the rear end of the pivoted frame is a fending wheel 17 preferably provided with a pneumatic tire 18.

The proportions are such that when the plow is propelled between the rows of trees in an orchard, the main frame traveling along the line 21, Fig. 3, the pivoted frame is extended under the influence of the spring 14, so that the disk 2 engages the soil at least up to the center line 22 passing thru the center of the trees. As the plow passes a tree, the fending wheel engages the trunk at about the time the cultivating implement has approached as closely as is safe for the tree, and with the onward movement of the plow the fending wheel rolls about the trunk of the tree forcing the disk to take a similar path about the base of the trunk. The path of the disk is indicated by the line 23. Thus at least one-half of the soil lying between the trees is worked on the trip up one side of the row of trees, the other half being worked on the return trip on the opposite side. With no extra labor for cross plowing the soil is worked close to each tree.

It will be noted that on account of the angular setting of the disk it will tend to run in between the rows with forward movement of the plow. The spring 14 is, however, useful in insuring this outward movement of the pivoted frame in the event that a furrow previously formed should prevent engagement of the disk with the soil.

A pin thru the aperture 24 in the bracket 11 and arcuate arm provides means for locking the pivoted frame rigidly to the main frame in any desired setting. When this is done the disk 2 operates merely as an extra share in the gang plow which can then be used for ordinary plowing.

I claim:

1. An apparatus for cultivating the soil between trees comprising a main frame adapted to be propelled in a substantially straight line past one side of the trees, a frame mounted on said main frame for pivotal movement about a vertical axis and normally extending to one side of the main frame, a spring interposed between said main and pivoted frames for resiliently pressing said pivoted frame to its normally extended position, a cultivating implement on the extended end of said pivoted frame, a fending wheel journaled about a substantially vertical axis on said pivoted frame, an arcuate arm on said pivoted frame concentric with the pivotal axis thereof, and guides on said main frame in which said arm is slidably arranged.

2. An apparatus for cultivating the soil between trees comprising a main frame adapted to be propelled in a substantially straight line past one side of the trees, a frame mounted on said main frame for pivotal movement about a vertical axis and normally extending to one side of the main frame, a spring interposed between said main and pivoted frames for resiliently pressing said pivoted frame to its normally extended position, a cultivating implement on the extended end of said pivoted frame, a fending wheel journaled about a substantially vertical axis on said pivoted frame, an arcuate arm fixed on said pivoted frame concentric with the pivotal axis thereof, and spaced guides on said main frame in which said arm is slidably arranged.

3. An apparatus for cultivating the soil between trees comprising a main frame adapted to be propelled in a substantially straight line past one side of the trees, a frame mounted on said main frame for pivotal movement about a pivotal axis and normally extending to one side of the main frame, a flat spring secured to the main frame and bearing on the pivoted frame for resiliently pressing said frame to its normally extended position, a cultivating implement on the extended end of said pivoted frame, a pneumatic tired fending wheel journaled about a substantially vertical axis on said pivoted frame, an arcuate arm fixed on said pivoted frame concentric with the pivotal axis thereof for carrying the torsional and lifting stresses exerted on said pivotal frame by said cultivating implement when in operation, guides on said main frame in which said arcuate arm is slidably arranged and means for adjustably limiting the spring pressed movement of the pivoted frame.

In testimony whereof, I have hereunto set my hand.

BARTHOLOMEW L. DRISCOLL.